United States Patent
Mikashima

(10) Patent No.: US 9,693,182 B2
(45) Date of Patent: Jun. 27, 2017

(54) IMAGE FORMING APPARATUS INCLUDING CONTROL ON NEAR FIELD COMMUNICATION

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/280,453

(22) Filed: Sep. 29, 2016

(65) Prior Publication Data

US 2017/0099566 A1 Apr. 6, 2017

(30) Foreign Application Priority Data

Oct. 6, 2015 (JP) .................. 2015-198291

(51) Int. Cl.
| | | |
|---|---|---|
| *H04W 4/00* | (2009.01) | |
| *H04B 5/00* | (2006.01) | |
| *H04L 29/08* | (2006.01) | |
| *H04N 1/00* | (2006.01) | |
| *H04N 1/32* | (2006.01) | |
| *H04W 88/08* | (2009.01) | |

(52) U.S. Cl.
CPC .......... H04W 4/008 (2013.01); H04L 67/306 (2013.01); H04N 1/00928 (2013.01); H04N 1/32101 (2013.01); H04N 1/32358 (2013.01); *H04N 2201/006* (2013.01); *H04N 2201/3202* (2013.01); *H04W 88/08* (2013.01)

(58) Field of Classification Search
CPC .......... H04B 1/59; H04B 5/00; H04B 5/0031; H04W 4/008; H04W 12/04
See application file for complete search history.

(56) References Cited

U.S. PATENT DOCUMENTS

| | | | | |
|---|---|---|---|---|
| 2010/0290084 | A1* | 11/2010 | Russell, III | ........ G05B 19/0428 358/1.15 |
| 2013/0314334 | A1* | 11/2013 | Leica | .................. H04B 5/0031 345/173 |
| 2014/0340698 | A1 | 11/2014 | Baba | ........................ 358/1.13 |
| 2015/0304478 | A1* | 10/2015 | Kim | .................. G06F 19/3418 455/414.3 |
| 2017/0085734 | A1* | 3/2017 | Satake | ............... H04N 1/00832 |

FOREIGN PATENT DOCUMENTS

JP 2014-230004 A 12/2014

* cited by examiner

*Primary Examiner* — Blane Jackson
(74) *Attorney, Agent, or Firm* — Stein IP, LLC

(57) ABSTRACT

An image forming apparatus includes a near field communication portion including a nonvolatile memory and a processing portion, the nonvolatile memory stores information indicating whether or not the output of log information is allowed and when the output of the log information is allowed, the processing portion performs start-up processing while outputting the log information whereas when the output of the log information is not allowed, the processing portion performs the start-up processing without outputting the log information, and a near field communication portion stores the log information output from the processing portion in the nonvolatile memory.

5 Claims, 4 Drawing Sheets

IMAGE FORMING APPARATUS INCLUDING CONTROL ON NEAR FIELD COMMUNICATION

INCORPORATION BY REFERENCE

This application is based upon and claims the benefit of priority from the corresponding Japanese Patent Application No. 2015-198291 filed on Oct. 6, 2015, the entire contents of which are incorporated herein by reference.

BACKGROUND

The present disclosure relates to an image forming apparatus which performs communication with an external communication terminal.

Conventionally, an image forming apparatus is known which can perform wireless communication with an external communication terminal. Such an image forming apparatus performs wireless communication with a smart phone or a tablet terminal owned by a user.

For example, in order to perform user authentication, the image forming apparatus described above communicates with a communication terminal owned by the user to acquire a user ID. Alternatively, when the image forming apparatus described above receives image data from the communication terminal owned by the user, the image forming apparatus performs printing based on the image data.

SUMMARY

An image forming apparatus of the present disclosure includes a near field communication portion and a processing portion. The near field communication portion includes a nonvolatile memory storing information and performs near field communication with an external communication terminal. The processing portion is connected to the near field communication portion such that the processing portion can communicate with the near field communication portion and performs start-up processing for starting up the image forming apparatus. The nonvolatile memory stores log output control information indicating whether or not the output of log information on the start-up processing to the near field communication portion is allowed. The processing portion checks the log output control information when the start-up processing is started, and when the output of the log information is allowed, the processing portion performs the start-up processing while outputting the log information to the near field communication portion whereas when the output of the log information is not allowed, the processing portion performs the start-up processing without outputting the log information to the near field communication. The near field communication portion stores the log information output from the processing portion in the nonvolatile memory.

DETAILED DESCRIPTION

<Overall Configuration of Image Forming Apparatus>

Figure 1:
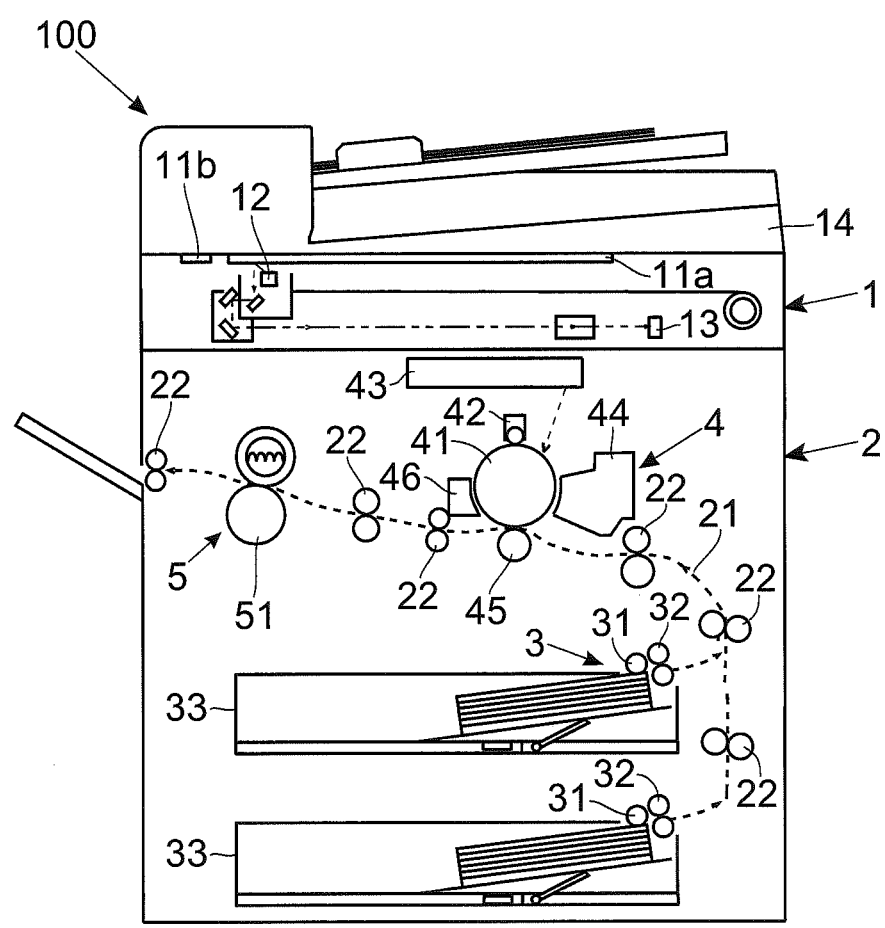
FIG. 1 is a diagram showing the configuration of an image forming apparatus according to an embodiment of the present disclosure.

As shown in FIG. 1, the image forming apparatus 100 of the present embodiment includes an image reading portion 1 and a printing portion 2.

The image reading portion 1 applies, with a lamp 12, light to an original document placed on a contact glass 11a, performs A/D conversion on the output value of an image sensor 13 which receives light reflected from the original document and thereby generates image data on the original document. The image reading portion 1 includes an original document transport unit 14 which transports the original document along an original document transport path that is passed through on a contact glass 11b. In a case where the original document transport unit 14 is used, when the original document which is being transported is passed through on the contact glass 11b, the original document is read by the image reading portion 1.

The printing portion 2 transports a sheet supplied to a sheet transport path 21 with a plurality of transport roller pairs 22. Here, the printing portion 2 forms a toner image based on image data (for example, the image data of the original document obtained by reading the original document with the image reading portion 1). Then, the printing portion 2 prints (transfers) the toner image to the sheet which is being transported. The printing portion 2 includes a paper feed portion 3, an image formation portion 4 and a fixing portion 5.

The paper feed portion 3 includes a pickup roller 31 and a paper feed roller pair 32, and supplies a sheet stored in a sheet cassette 33 to the sheet transport path 21. The image formation portion 4 includes a photosensitive drum 41, a charging device 42, an exposure device 43, a development device 44, a transfer roller 45 and a cleaning device 46, forms the toner image based on the image data and transfers the toner image to the sheet. The fixing portion 5 includes a fixing roller pair 51, and heats and pressurizes the sheet to fix the toner image to the sheet.

<Hardware Configuration of Image Forming Apparatus>

Figure 2:
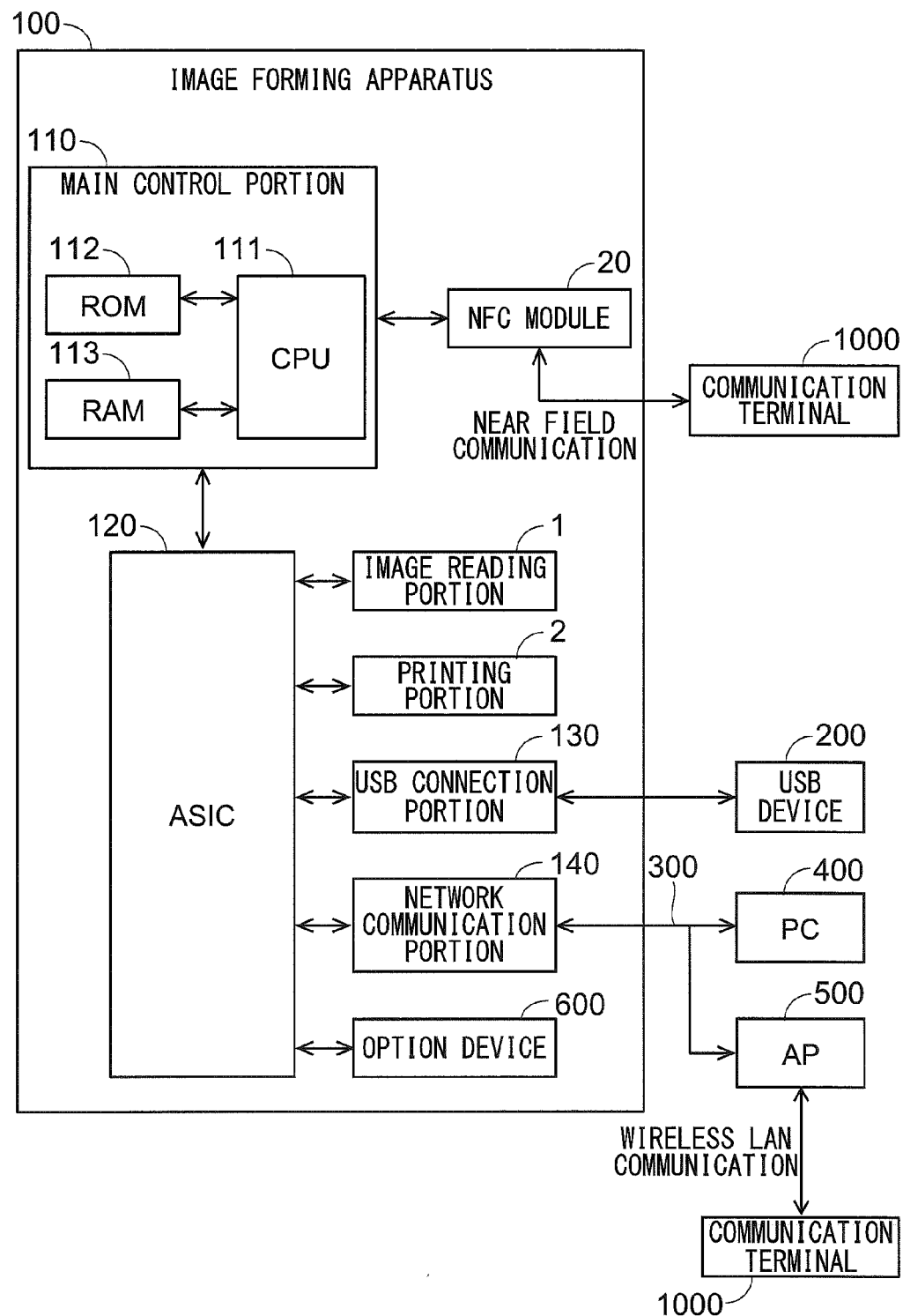
FIG. 2 is a diagram showing the hardware configuration of the image forming apparatus according to the embodiment of the present disclosure.

As shown in FIG. 2, the image forming apparatus 100 includes a main control portion 110. The main control portion 110 performs overall control and performs control on the individual portions of the image reading portion 1 and the printing portion 2. The main control portion 110 also performs various types of image processing such as concentration conversion processing, enlargement/reduction processing and data format conversion processing on the image data. Furthermore, the main control portion 110 controls communication with a USB device 200 connected to the image forming apparatus 100 and communication through a local area network (LAN) 300.

The main control portion 110 includes a CPU 111, a ROM 112 and a RAM 113. The CPU 111 is connected to the ROM 112 and the RAM 113. For example, the ROM 112 is a flash ROM, and the RAM 113 is a dynamic RAM (DRAM). Control program and data are stored in the ROM 112, and are expanded to the RAM 113. The CPU 111 is operated based on the control program and data.

The main control portion 110 is connected to an ASIC 120 which performs specific processing. The ASIC 120 is connected to the image reading portion 1 and the printing portion 2. For example, when the original document is read by the image reading portion 1, the ASIC 120 receives, from the image reading portion 1, the image data on the original document obtained by the reading. The main control portion 110 and the ASIC 120 perform image processing on the image data on the original document, and thus the image data is converted into exposure image data (data for turning on and off the light-emitting element of the exposure device 43). Then, the ASIC 120 transmits the exposure image data to the printing portion 2.

The ASIC 120 is connected to a USB connection portion 130. The USB connection portion 130 is an interface for connecting the USB device 200 to the image forming apparatus 100. For example, a USB memory or the like is connected to the USB connection portion 130. The ASIC 120 exchanges data with the USB device 200 connected to the USB connection portion 130.

The ASIC 120 is also connected to a network communication portion 140. The network communication portion 140 is connected through the LAN 300 to a personal computer (PC) 400 used by the user of the image forming apparatus 100 such that the network communication portion 140 can communicate with the personal computer.

For example, the network communication portion 140 receives job data (data including image data on an image to be printed, print conditions and job performance requirements) from the PC 400. When the network communication portion 140 receives the job data, the main control portion 110 and the ASIC 120 perform various types of image processing on the image data included in the job data. Then, the ASIC 120 transmits the exposure image data to the printing portion 2. In this way, a job (printer job) based on the job data is performed by the printing portion 2.

A wireless LAN access point (AP) 500 is connected to the LAN 300. In this way, wireless LAN communication can be performed between the image forming apparatus 100 and the PC 400 which are connected through the AP 500 to the LAN 300.

Here, in a general image forming apparatus, an operation panel is installed, and various types of settings on the image forming apparatus are received through the operation panel. For example, for a copy job and a transmission job, settings such as the number of copies, a sheet size and a transmission destination address are performed with the operation panel. An instruction to start a job, an instruction to stop a job and the like are also performed with the operation panel.

However, in the present embodiment, the operation panel is not installed in the image forming apparatus 100. Various types of settings on the image forming apparatus 100 are performed with a portable communication terminal 100 owned by the user. In other words, the communication terminal 1000 owned by the user replaces the operation panel of the image forming apparatus 100. For example, the communication terminal 1000 is a smart phone, a table terminal or the like. In order to use the communication terminal 1000 as the operation panel of the image forming apparatus 100, it is necessary to incorporate a wireless LAN function in the communication terminal 1000.

In the communication terminal 1000 which can be used as the operation panel of the image forming apparatus 100, a dedicated application for using the communication terminal 1000 to perform various types of settings on the image forming apparatus 100 is previously installed. When the application is started up, a job setting screen is displayed on the communication terminal 1000, and thus various types of settings such as the selection of a job and the performance conditions of the selected job can be performed.

Setting information which indicates the details of the setting performed with the communication terminal 1000 is transmitted through the AP 500 and the LAN 300 from the communication terminal 1000 to the image forming apparatus 100. Then, when the image forming apparatus 100 receives the setting information from the communication terminal 1000, the image forming apparatus 100 changes the details of the setting in the apparatus based on the setting information, and performs the job. In this way, it is not necessary to provide the operation panel in the image forming apparatus 100.

A wireless LAN board may be incorporated in the image forming apparatus 100 (a portion which incorporates the wireless LAN board may be the network communication portion 140). In this case, wireless LAN communication can be performed between the image forming apparatus 100 and the communication terminal 1000 without the intervention of the AP 500.

When an option device 600 (not shown in FIG. 1) such as a post-processing device (device for performing stapling processing or the like) or a paper feed device is fitted to the image forming apparatus 100, the ASIC 120 is connected to the option device 600 such that the ASIC 120 can communicate with the option device 600. Then, the ASIC 120 provides various types of instructions such as the start timing of processing performance to the option device 600.

<NFC Module>

As shown in FIG. 2, an NFC module 20 is incorporated in the image forming apparatus 100, and the NFC module 20 is connected to the main control portion 110. The NFC module 20 is a communication module which is compliant with NFC (Near Field Communication), and performs communication with a communication method based on a near field communication standard (NFC standard) using a frequency band of 13.56 MHz. Specifically, when an NFC-compliant device is brought close to the NFC module 20 with a distance of about several centimeters left therebetween, data can be exchanged between the NFC module 20 and the NFC-compliant device in a noncontact manner. The NFC module 20 corresponds to a "near field communication portion".

Examples of the NFC-compliant device which can perform the near field communication with the NFC module 20 include a smart phone, a tablet terminal and a notebook type PC. The communication terminal 1000 owned by the user of the image forming apparatus 100 is also an NFC-compliant device, and the communication terminal 1000 functions as an NFC reader/writer.

For example, the NFC module 20 is used to perform user authentication (the authentication of the communication terminal 1000 owned by the user). In the user authentication, the user who receives the user authentication brings the communication terminal 1000 owned by the user close to the NFC module 20, and the NFC module 20 and the communication terminal 1000 communicate with each other. Then, the NFC module 20 acquires an authentication ID necessary for the authentication from the communication terminal 1000, and transmits it to the main control portion 110.

The main control portion 110 compares the authentication ID acquired from the NFC module 20 with a previously registered registration ID, and determines, when they agree with each other, that the user receiving the authentication is a valid user. The communication terminal 1000 owned by the valid user is registered, and thus wireless LAN communication can be performed with the image forming apparatus 100 (various types of settings on the image forming apparatus 100 can be performed).

Figure 3:
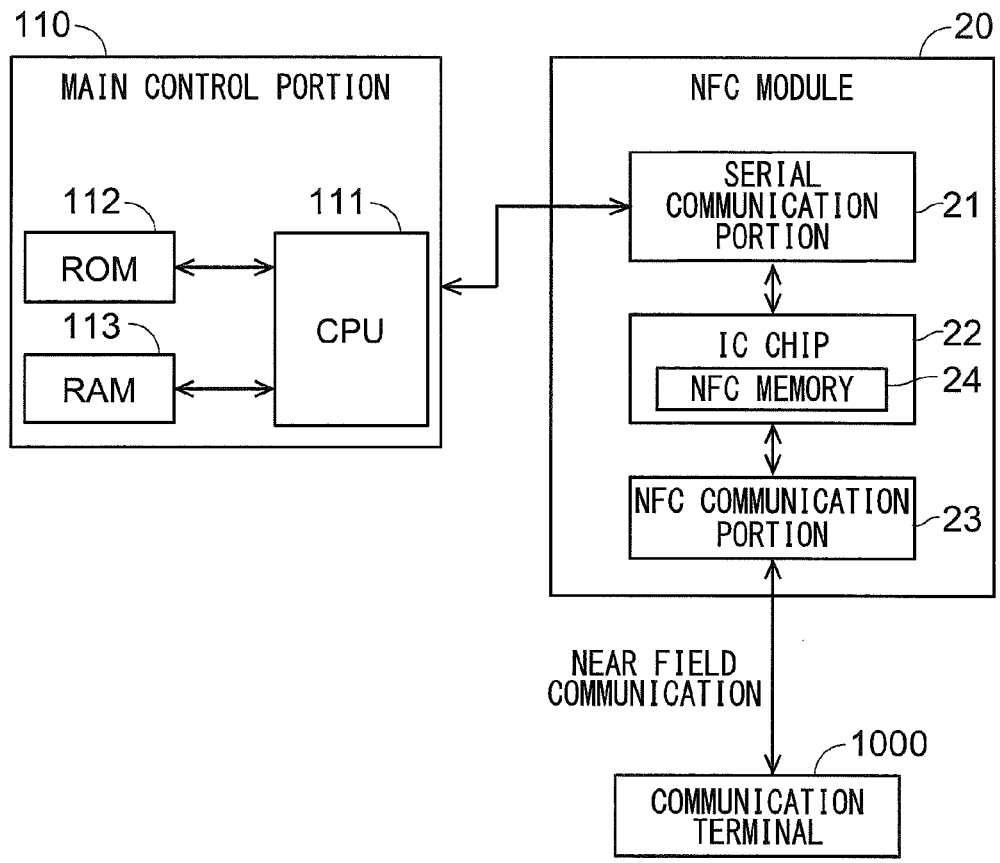
FIG. 3 is a diagram for illustrating an NFC module which is incorporated in the image forming apparatus according to the embodiment of the present disclosure.

The NFC module 20 includes, as shown in FIG. 3, a serial communication portion 21, an IC chip 22 and an NFC communication portion 23.

The serial communication portion 21 is an interface for performing communication based on the standards of an SPI (Serial Peripheral Interface) and an I2C (Inter-Integrated Circuit). The serial communication portion 21 is connected to the main control portion 110 such that the serial communication portion 21 can communicate with the main control portion 110. Then, the main control portion 110 exchanges data with the NFC module 20.

The IC chip 22 includes a nonvolatile memory 24 (in the following description, refers to an NFC memory 24). The main control portion 110 communicates with the NFC module 20, and thereby writes information into the NFC memory 24 and reads information from the NFC memory 24.

Although described in detail later, the main control portion 110 outputs log information to the NFC module 20 and writes the log information into the NFC memory 24. The main control portion 110 also reads, from the NFC module 20, log output control information stored in the NFC memory 24, and checks the output control information (determines whether or not the log information is output to the NFC module 20). In this configuration, the main control portion 110 corresponds to a "processing portion".

The NFC communication portion 23 is included as an antenna (antenna coil) which is formed by winding a conductive wire into the shape of a coil. The IC chip 22 performs the near field communication with the communication terminal 1000 through the NFC communication portion 23, and thereby writes the information (such as the log output control information) received from the communication terminal 1000 into the NFC memory 24 and transmits the information (such as the log information) stored in the NFC memory 24 to the communication terminal 1000.

The NFC module 20 is a passive type, and is operated with an induced current obtained by the utilization of electromagnetic waves from the NFC-compliant device even when power is not supplied to the image forming apparatus 100. In this way, even when an abnormality occurs such as when the image forming apparatus 100 is not started up, it is possible to perform communication between the NFC module 20 and the communication terminal 1000.

<Start-Up Processing on Image Forming Apparatus>

Figure 4:
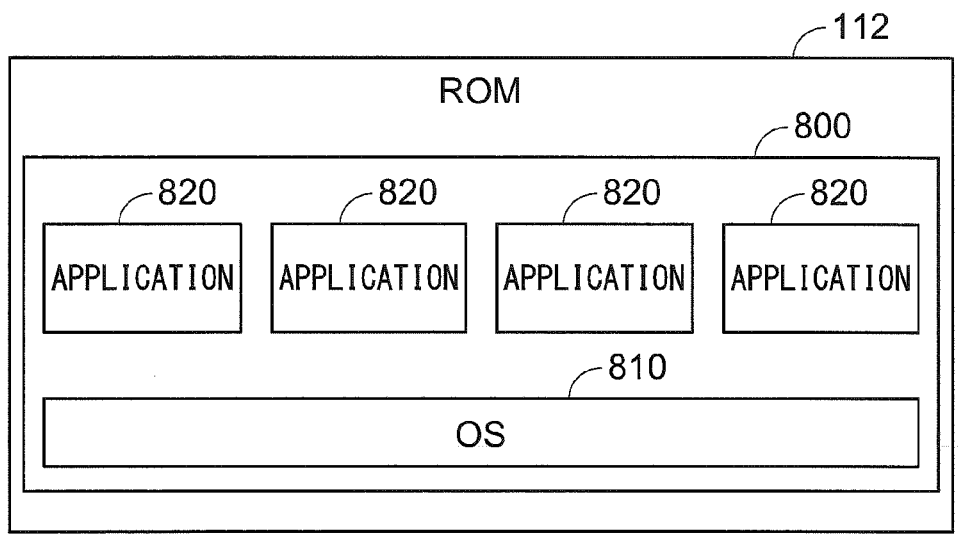
FIG. 4 is a diagram for illustrating software which is stored in the image forming apparatus according to the embodiment of the present disclosure.

As shown in FIG. 4, in the ROM 112, software 800 (firmware) for performing control on the hardware is stored. The software 800 includes an operating system (OS) 810. The software 800 also includes applications 820 for performing various types of processing such as image processing and communication processing. The CPU 111 performs, as a part of start-up processing on the image forming apparatus 100, processing (boot processing) which reads the software 800 to the RAM 113 to perform start-up.

Specifically, when power is fed to the image forming apparatus 100, the CPU 111 reads, according to a boot program stored in the ROM 112, a kernel (portion which is the core of the OS 810) to the RAM 113, and starts up the OS 810. Then, the CPU 111 reads the applications 820 to the RAM 113 and expands them.

Here, after power is fed to the image forming apparatus 100, before the boot processing, as a part of the start-up processing, a self-diagnosis for detecting whether or not an abnormality occurs in each of the devices (the CPU 111, the ROM 112 and the RAM 113) within the main control portion 110 may be performed. A plurality of items of the self-diagnosis are present, and an example thereof is a memory test on the RAM 113.

In order to perform self-diagnosis processing when the image forming apparatus 100 is started up, a self-diagnosis circuit may be provided in each of the devices in the main control portion 110. In the main control portion 110, a self-diagnosis circuit may be separately provided. Alternatively, a self-diagnosis on the ROM 112 and the RAM 113 may be performed by the CPU 111.

<Writing of Log Information>

In a case where an abnormality occurs at the time of the start-up of the image forming apparatus 100, when the image forming apparatus 100 is restarted, and the log information on the start-up processing performed here is checked, the cause of the abnormality may be identified. Hence, in the maintenance of the image forming apparatus 100, in order for the log information to be checked, in general, the image forming apparatus 100 is restarted.

Here, in the image forming apparatus 100, the operation panel is not installed. Hence, it is impossible to display, on the operation panel, the log information on the start-up processing and to then check it. Therefore, for example, the following measures are taken. After the start-up of the image forming apparatus 100, wireless LAN communication is established between the image forming apparatus 100 and the communication terminal 1000, and the log information is captured from the image forming apparatus 100 to the communication terminal 1000.

However, the wireless LAN communication between the image forming apparatus 100 and the communication terminal 1000 cannot be performed until the software 800 (see FIG. 4) is properly started up. Hence, in a case where the start-up processing of the image forming apparatus 100 is not completed (for example, in a case where the start-up processing is interrupted halfway through the boot processing), even when it is desired to check the log information by performing the wireless LAN communication between the image forming apparatus 100 and the communication terminal 1000, it is impossible to establish the wireless LAN communication. In other words, it is impossible to check the log information.

Hence, in the present embodiment, the start-up processing is performed while the log information on the start-up processing of the image forming apparatus 100 is being written into the NFC memory 24 provided in the NFC module 20. In this case, even when the start-up processing of the image forming apparatus 100 is not completed, and thus the wireless LAN communication between the image forming apparatus 100 and the communication terminal 1000 cannot be performed, since the near field communication can be performed between the NFC module 20 and the communication terminal 1000, it is possible to capture the log information from the NFC module 20 (the NFC memory 24) to the communication terminal 1000.

For example, in a maintenance communication terminal 1000 used by maintenance staff, an application for acquiring the log information from the NFC module 20 is installed. When the log information is stored in the NFC memory 24, and the maintenance communication terminal 1000 enters a distance range (a range of about several centimeters from the NFC module 20) where the near field communication can be performed, the NFC module 20 transmits the log information to the maintenance communication terminal 1000. In this way, it is possible to check the log information.

However, when the start-up processing is performed while the log information on the start-up processing of the image forming apparatus 100 is being written into the NFC memory 24, the completion of the start-up processing is delayed. Hence, when no abnormality occurs in the image forming apparatus 100, the log information is preferably prevented from being written.

Hence, in the present embodiment, it is possible to perform a setting as to whether or not the writing of the log information on the start-up processing of the image forming apparatus 100 is allowed. Specifically, the log output control information indicating whether or not the output of the log information to the NFC module 20 is allowed is previously stored in the NFC memory 24 of the NFC unit 20. The setting for whether or not to allow the writing of the log information can be performed by rewriting the log output control information. When in the setting of the log output control information, the writing is allowed, the log information is output from the main control portion 110 to the NFC module 20 while the start-up processing is being performed, and the log information is written into the NFC memory 24. When in the setting of the log output control information, the writing is not allowed, the log information is not output from the main control portion 110 to the NFC module 20 while the start-up processing is being performed (the log information is not written into the NFC memory 24).

When the NFC module 20 receives the log output control information from the communication terminal 1000, the NFC module 20 rewrites the existing log output control information stored in the NFC memory 24 to the new log output control information received from the communication terminal 1000. In this way, when it is necessary to check the log information, the log output control information indicating that the output of the log information is allowed is transmitted from the communication terminal 1000 to the NFC unit 20 whereas when it is not necessary to check the log information, the log output control information indicating that the output of the log information is not allowed is transmitted from the communication terminal 1000 to the NFC unit 20.

When the output of the log information is not allowed, the self-diagnosis processing is not performed by the main control portion 110. The self-diagnosis processing by the main control portion 110 is performed only when the output of the log information is allowed.

Figure 5:
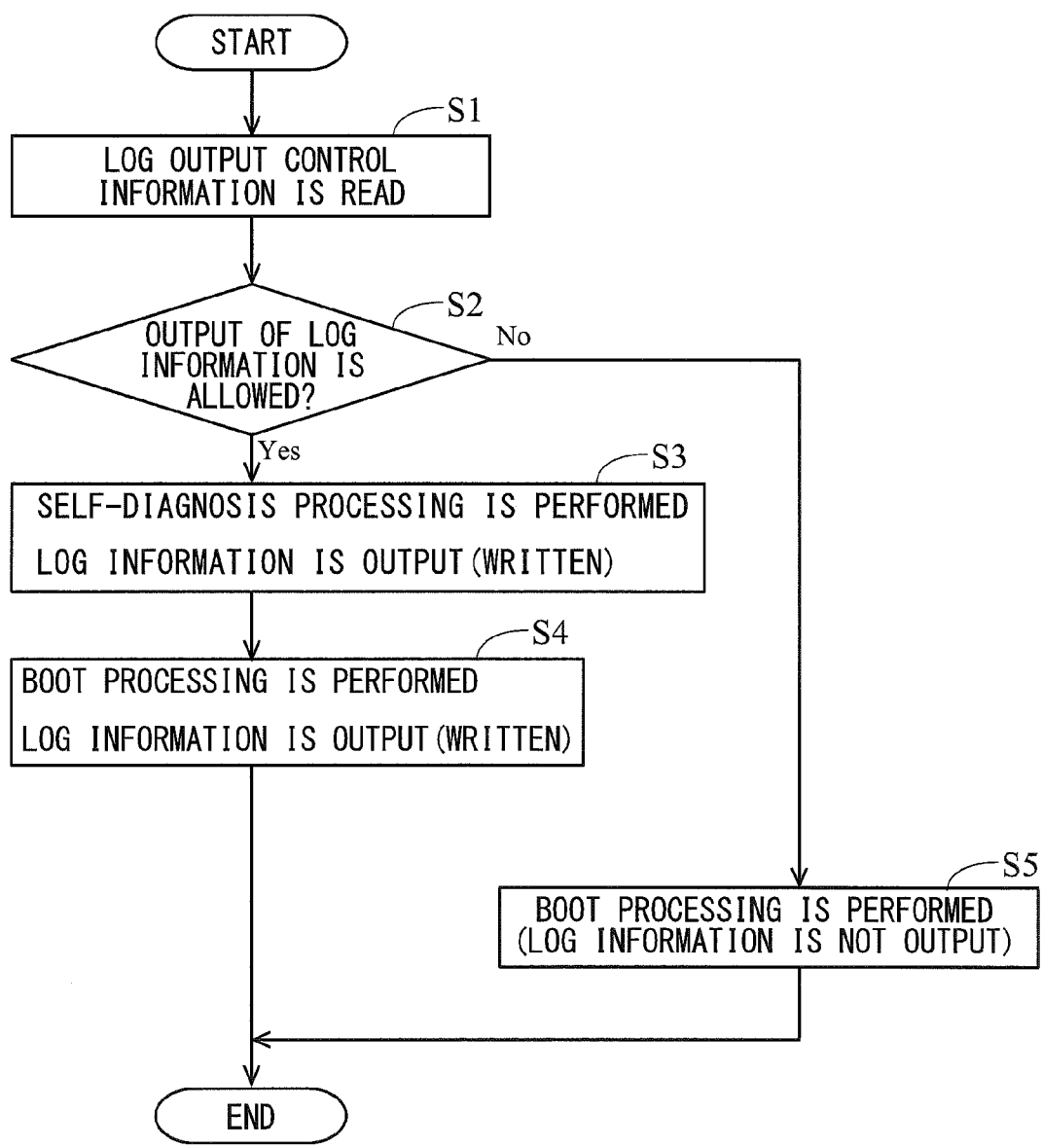
FIG. 5 is a diagram for illustrating the flow of processing when the image forming apparatus according to the embodiment of the present disclosure is started up.

The flow of the processing when the image forming apparatus 100 is started up will be described below with reference to a flowchart shown in FIG. 5. The start of the flowchart shown in FIG. 5 is when power is fed to the image forming apparatus 100.

In step S1, the main control portion 110 reads the log output control information stored in the NFC memory 24 of the NFC module 20 and checks the details of the log output control information. Then, in step S2, the main control portion 110 determines whether or not the output of the log information is allowed. As a result, when the main control portion 110 determines that the output of the log information is allowed, the process is transferred to step S3.

When the process is transferred to step S3, the main control portion 110 performs the self-diagnosis processing as a part of the start-up processing. Here, the main control portion 110 outputs information indicating the result of the self-diagnosis processing as the log information to the NFC module 20. In this way, in the NFC module 20, the log information is written into the NFC memory 24.

In step S4, the main control portion 110 performs the boot processing as a part of the start-up processing while outputting the log information to the NFC module 20. In other words, the main control portion 110 performs the processing (such as the reading from the ROM 112 and the expansion to the RAM 113) for starting up the software 800 including the OS 810 and the applications 820.

Thereafter, when the start-up processing properly proceeds, all the software 800 is started up, and thus the image forming apparatus 100 is brought into a ready state (a state where a job can be performed). In other words, since the wireless LAN communication between the image forming apparatus 100 and the communication terminal 1000 can be performed, various types of settings on the image forming apparatus 100 can be performed with the communication terminal 1000.

On the other hand, when the start-up processing is not completed, the image forming apparatus 100 is not brought into the ready state. In this case, it is impossible to establish the wireless LAN communication between the image forming apparatus 100 and the communication terminal 1000. However, the near field communication can be performed between the NFC module 20 and the communication terminal 1000. Hence, the near field communication is performed between the NFC module 20 and the communication terminal 1000, and thus it is possible to capture the log information on the start-up processing stored in the NFC module 20 (the NFC memory 24) to the communication terminal 1000.

When in step S2, the main control portion 110 determines that the output of the log information is not allowed, the process is transferred to step S5. When the process is transferred to step S5, the main control portion 110 omits the self-diagnosis processing and performs the boot processing. Here, the main control portion 110 does not output the log information to the NFC module 20. Hence, the log information on the start-up processing is not left. Therefore, when it is desired to check the log information, it is necessary to rewrite the log output control information stored in the NFC module 20 and to then restart the image forming apparatus 100.

As described above, the image forming apparatus 100 of the present embodiment includes the NFC module 20 (near field communication portion) which includes the NFC memory 24 (nonvolatile memory) storing information and which performs the near field communication with the external communication terminal 1000 and the main control portion 110 (processing portion) which is connected to the NFC module 20 such that the main control portion 110 can communicate with the NFC module 20 and which performs the start-up processing for starting up the image forming apparatus 100. The NFC memory 24 stores the log output control information indicating whether or not the output of the log information on the start-up processing to the NFC module 20 is allowed. The main control portion 110 checks the log output control information when the start-up processing is started, and when the output of the log information is allowed, the main control portion 110 performs the start-up processing while outputting the log information to the NFC module 20 whereas when the output of the log information is not allowed, the main control portion 110 performs the start-up processing without outputting the log information to the NFC module 20 and the NFC module 20 stores the log information output from the main control portion 110 in the NFC memory 24.

In the configuration of the present embodiment, when it is desired to check the log information on the start-up processing (such as when maintenance for removing an abnormality occurring in the image forming apparatus 100 is performed), the log output control information is rewritten such that the log information is output to the NFC module 20, and then the image forming apparatus 100 is restarted, with the result that the log information is output to the NFC module 20 while the start-up processing is being performed by the main control portion 110 and is stored in the NFC module 20. Hence, even when the start-up processing is not properly completed, the near field communication is performed between the NFC module 20 and the communication terminal 1000, and thus it is possible to capture the log information from the NFC module 20 to the communication terminal 1000 (it is possible to easily acquire the log information from the image forming apparatus 100).

Thereafter, when it is not necessary to check the log information on the start-up processing (such as when the abnormality in the image forming apparatus 100 is removed by the maintenance), the log output control information is rewritten such that the log information is prevented from being output to the NFC module 20, and thus even when the image forming apparatus 100 is started up thereafter, the log information is not output to the NFC module 20 while the start-up processing is being performed by the main control portion 110. In this way, the completion of the start-up processing is prevented from being delayed, with the result that the convenience of the user is prevented from being reduced.

In the present embodiment, as described above, when the NFC module 20 receives the log output control information from the communication terminal 1000, the NFC module 20 rewrites the existing log output control information stored in the NFC memory 24 to the new log output control information received from the communication terminal 1000. In this way, even when it is impossible to establish the wireless LAN communication between the image forming apparatus 100 and the communication terminal 1000, it is possible to easily perform, with the communication terminal 1000, a setting as to whether or not the output of the log information to the NFC module 20 is allowed.

In the present embodiment, as described above, when the log information is stored in the NFC memory 24, and the communication terminal 1000 enters the distance range where the near field communication can be performed, the NFC module 20 transmits the log information to the communication terminal 1000. In other words, the communication terminal 1000 is only brought close to the NFC module 20, and thus the log information is transmitted from the NFC module 20 to the communication terminal 1000. In this way, it is possible to easily acquire the log information without performing a large number of operations and pieces of work.

In the present embodiment, as described above, when the output of the log information is allowed, the main control portion 110 performs, as a part of the start-up processing, the self-diagnosis processing for detecting whether or not an abnormality occurs whereas when the output of the log information is not allowed, the main control portion 110 does not perform the self-diagnosis processing at the time of the performance of the start-up processing. In this way, when it is not necessary to check the log information on the start-up processing (when in the setting for the log output control information, the output is allowed), since the self-diagnosis processing is not performed, the start-up processing is rapidly completed. Hence, a waiting time after power is fed to the image forming apparatus 100 until it is possible to use the image forming apparatus 100 is reduced, with the result that the convenience of the user is enhanced.

The embodiment disclosed herein should be considered to be illustrative in all respects and not restrictive. The scope of the present disclosure is indicated not by the description of the above embodiment but by the scope of claims, and furthermore, meanings equivalent to the scope of claims and all modifications within the scope are included.

What is claimed is:

1. An image forming apparatus comprising:
a near field communication portion which includes a nonvolatile memory storing information and which performs near field communication with an external communication terminal; and
a processing portion which is connected to the near field communication portion such that the processing portion can communicate with the near field communication portion and which performs start-up processing for starting up the image forming apparatus,
wherein the nonvolatile memory stores log output control information indicating whether or not an output of log information on the start-up processing to the near field communication portion is allowed,
the processing portion checks the log output control information when the start-up processing is started, and when the output of the log information is allowed, the processing portion performs the start-up processing while outputting the log information to the near field communication portion whereas when the output of the log information is not allowed, the processing portion performs the start-up processing without outputting the log information to the near field communication and
the near field communication portion stores the log information output from the processing portion in the nonvolatile memory.

2. The image forming apparatus according to claim 1,
wherein when the near field communication portion receives the log output control information from the communication terminal, the near field communication portion rewrites the existing log output control information stored in the nonvolatile memory to the new log output control information received from the communication terminal.

3. The image forming apparatus according to claim 1,
wherein when the log information is stored in the nonvolatile memory, and the communication terminal enters a distance range where the near field communication can be performed, the near field communication portion transmits the log information to the communication terminal.

4. The image forming apparatus according to claim 1,
wherein when the output of the log information is allowed, the processing portion performs, as a part of the start-up processing, self-diagnosis processing for detecting whether or not an abnormality occurs whereas when the output of the log information is not allowed, the processing portion does not perform the self-diagnosis processing at a time of the performance of the start-up processing.

5. The image forming apparatus according to claim 1,
wherein the near field communication portion performs communication with the communication terminal with a communication method based on an NFC (Near Field Communication) standard.

* * * * *